Oct. 16, 1951 G. OLAH 2,571,377
ROTARY DISPLACEMENT PUMP
Filed May 14, 1948
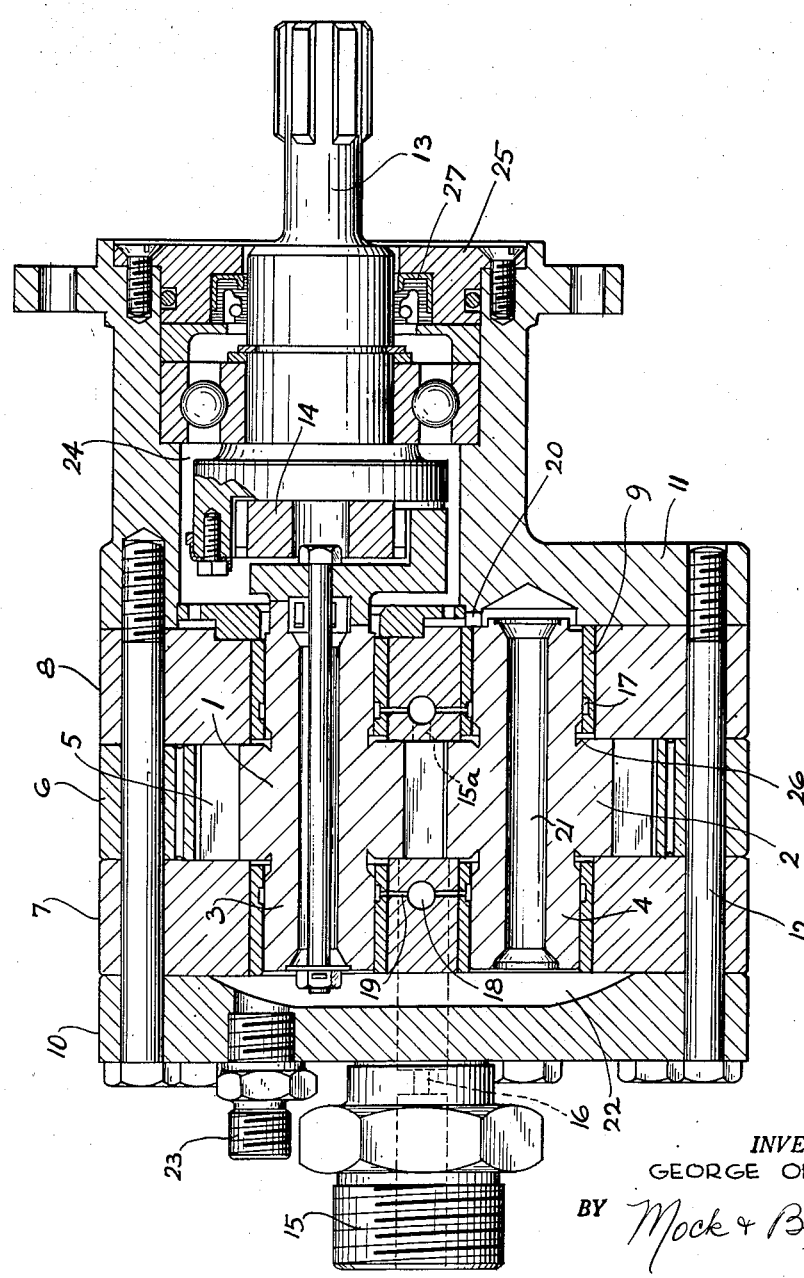
INVENTOR.
GEORGE OLAH
BY Mock & Blum
ATTORNEYS.

Patented Oct. 16, 1951

2,571,377

UNITED STATES PATENT OFFICE 2,571,377

ROTARY DISPLACEMENT PUMP

George Olah, Ealing, England, assignor to Precision Developments Company Limited, London, England, a British company Application May 14, 1948, Serial No. 27,049
In Great Britain May 15, 1947

3 Claims. (Cl. 103—126)

This invention relates to rotary displacement pumps and is more particularly applicable to gear pumps; it has for an object to provide improved means by which the gears or other rotary displacement elements may be centralized in their axial direction in the pump housing. The journal bearings of the gears or other rotary displacement elements may also be effectively lubricated by these means.

Other objects and various aspects of the invention will become apparent as this description proceeds. For the better understanding of the operation of the invention, it may be assumed that pumping fluid under pressure, preferably liquid under the influence of pump-delivery pressure, is supplied to journal or similar gaps surrounding the shaft or axle of a rotary displacement element at both sides of this element and at some axial distance from the end of this gap which communicates with the radial gap between the rotary displacement element and the pump housing. A flow of fluid is thus established through the journal gap and the radial gap at each end of the rotary displacement element to all those points of the circumference of the rotary displacement element at which the pressure is lower than the pressure at which fluid is supplied to the journal or similar gaps. So long as the rotary displacement element is spaced equally at its two ends from the pump housing, this flow and the distribution of pressure produced by it will be symmetrical at the two sides of the rotary displacement element, so that no resultant axial pressure is produced. Should however at any time the displacement element be located asymmetrically in the pump housing, that is to say nearer to one of its end walls than to the other, the pressure drop in the radial gap at the end of the displacement element will be higher and the pressure drop along the pump axle lower on the side on which the axial distance between the displacement element and the pump housings is smaller. In consequence a higher mean pressure will be established on this side of the rotary displacement element than on its opposite side, so that there will be a resultant axial force trying to return the rotary displacement element to its central position.

In order that the invention may be more readily understood, a gear pump incorporating the invention by way of example will now be described in more detail with reference to the accompanying drawing, in which Fig. 1 shows the pump in an axial section. Referring to Fig. 1, 1 and 2 are two pumping gears formed integral respectively with shafts 3 and 4, and the teeth 5 of these gears cooperate with a housing centre plate 6, while the end faces of the gears form a seal with outer housing plates 7 and 8, which contain bearings 9 for the gear wheel shaft; the housing is completed by cover plates 10, 11, all the housing plates being secured together by bolts 12. The shaft 3 of the gear 1 serves for transmitting the drive from a driving shaft 13, to which it is connected by a coupling 14 of the Oldham type. Inlet and delivery passages are provided in the pump housing and lead in the customary manner to pipe connections, only the delivery passage 15 being visible in the drawing. Each bearing 9 is provided at approximately one quarter of its length from its inner end with a circumferential groove 17, the depth of which may be .015 inch, and all these grooves are connected by cross bores 18 and passages 19 to the delivery passage 15 or a corresponding passage 15a on the opposite side of the pumping gears 1 and 2. In this manner grooves 17 receive a constant supply of hydraulic liquid, generally oil, under such pump delivery pressure. A restriction 16 is preferably provided in the pump delivery passage 15 in order to ensure that a certain minimum pressure is always maintained in the cross bores 18 and passages 19, even when the pump temporarily runs against very light pressure, for example, during the approach stroke of a self-contained hydraulic press. Further passages 20, 21, 22, serve for connecting the outer end of each bearing 9 to a draining passage 23, while the pumping gears 1 and 2 are recessed at the root of their axle portions 3, 4, to form circular chambers 26.

The coupling 14 between shaft 3 and driving shaft 13 is arranged in a chamber 24 which, being in communication with passage 20, is always filled with oil, and which is closed by cover plate 25, 27 being an oil seal.

In operation, the pressure in cross bores 18 and grooves 17 will cause operating liquid of the pump (e. g. oil) to pass continuously from grooves 17 along shafts 3 and 4 both to the outer ends of the bearings 9, from where it is drained through passages 20, 21, 22, 23, and inwardly where at the inner end of the journal bearing it will enter the gap of annular groove type between the side faces of the pumping gears 1 and 2 and the inner surface of plates 7 and 8 and pass through these gaps to the pumping chamber wherever the pressure in the latter is less than pump delivery pressure. As long as the pumping gears are properly located in a central position axially between the two plates 7 and 8, the width of these gaps is equal, so that the resistance to the inwardly directed flow is equal on both sides of each gear.

When, on the other hand, one or the other pumping gear moves axially out of this position, the gap at one of its side faces will be reduced, while that at its other side face is simultaneously increased. The former gap will thus offer a greater and the latter gap less resistance to the flow of liquid from the adjacent bearing, while the resistance in each case between groove 17 and the outer end of the bearing remains unaltered. In consequence of this, the pressure in chamber 26 and the mean pressure on the side face of the pumping gear in question at the side at which the gap has become narrower, will exceed the corresponding pressure at the opposite side, and the pressure difference will act to restore the pumping gear to its central position.

I claim:

1. A gear pump, including a shaft, a pump housing, at least one pumping gear mounted on said shaft for common rotation therewith in said pump housing, the shaft being journalled by bearings in said housing on each side of said gears, passages in the pump housing for supplying pumping liquid having delivery pressure to the bearings at each side of said pumping gear at points spaced from the inner end of each said bearing with the delivery point intermediate the ends of the bearing to thereby provide bearing lubrication by pumping liquid movement in opposite directions from such delivery point of the bearing, the liquid traversing the inner end zone of the bearing having its flow path including an annular gap formation of groove type exposed to the inner end of the bearing and to an adjacent side face of the gear for producing a zonal pressure differential between the two sides of the pumping gear in response to axial displacement of the latter from a normal position in the pump housing, and means for draining liquid escaping from the outer end of the bearing.

2. An arrangement as claimed in claim 1, in which the point in the bearings to which the passages lead is spaced from the outer end of the bearing about three times the distance from the inner end of the same bearing.

3. In gear pump assemblies, a pump housing, a pair of pumping gears and their integral shafts mounted for rotation within the pump housing, said shafts being journalled by bearings on each side of said gears, passages in the pump housing for supplying pumping liquid of delivery pressure source to the bearings at each side of a pumping gear to thereby lubricate each bearing, the point of delivery of the liquid to each bearing being in an intermediate position in the length of the bearing with the position spaced from both ends of and nearest the inner end of each bearing, and means for draining liquid escaping from the outer end of such bearings whereby each bearing will receive lubrication throughout the full length of the bearing, the position of the liquid delivery point within the length of the bearing being such as to cause the delivery point to establish zones between the delivery position in the bearing and the bearing inner and outer ends of each bearing for lubricating the bearings, the inner end zone of each bearing leading to a side face of the gear and having a gap formation of annular groove type between the bearing and adjacent gear side face to thereby produce a pressure differential between opposite side faces of the gear in response to axial displacement of the gear from its normal position in the pump housing and in presence of such displacement to automatically restore the displaced gear to such normal position.

GEORGE OLAH.

REFERENCES CITED

The following references are of record in the file of this patent:

UNITED STATES PATENTS

| Number | Name | Date |
| --- | --- | --- |
| 847,946 | Kaiser | Mar. 19, 1907 |
| 848,446 | Crowell | Mar. 26, 1907 |
| 960,993 | Motsinger | June 7, 1910 |
| 1,105,312 | Sundh | July 28, 1914 |
| 1,379,587 | Fisher | May 24, 1921 |
| 1,620,261 | Kennedy | Mar. 8, 1927 |
| 1,673,259 | Meston et al. | June 12, 1928 |
| 2,212,994 | Vrolix | Aug. 27, 1940 |
| 2,479,077 | McAlvay | Aug. 16, 1949 |